United States Patent
Bratthäll

(10) Patent No.: US 10,030,670 B2
(45) Date of Patent: Jul. 24, 2018

(54) COOLING ARRANGEMENT OF A PUMP INTENDED FOR PUMPING A LIQUID

(71) Applicant: Xylem IP Management S.à r.l., Senningerberg (LU)

(72) Inventor: Johan Bratthäll, Saltsjö Boo (SE)

(73) Assignee: XYLEM IP MANAGEMENT S.À R.L., Senningerberg (LU)

( * ) Notice: Subject to any disclaimer, the term of this patent is extended or adjusted under 35 U.S.C. 154(b) by 267 days.

(21) Appl. No.: 14/651,515

(22) PCT Filed: Dec. 2, 2013

(86) PCT No.: PCT/EP2013/075217
§ 371 (c)(1),
(2) Date: Jun. 11, 2015

(87) PCT Pub. No.: WO2014/090613
PCT Pub. Date: Jun. 19, 2014

(65) Prior Publication Data
US 2015/0322966 A1   Nov. 12, 2015

(30) Foreign Application Priority Data

Dec. 14, 2012 (SE) ...................................... 1251424

(51) Int. Cl.
*F04D 29/58* (2006.01)
*F04D 13/06* (2006.01)
(Continued)

(52) U.S. Cl.
CPC .......... *F04D 29/5806* (2013.01); *F04B 17/03* (2013.01); *F04B 53/08* (2013.01);
(Continued)

(58) Field of Classification Search
CPC .......... F04B 17/03; F04B 53/08; F04D 13/06; F04D 13/083; F04D 29/046;
(Continued)

(56) References Cited

U.S. PATENT DOCUMENTS 3,653,785 A * 4/1972 Dahlgren .............. F04D 29/586
165/104.31
3,947,154 A * 3/1976 Klepp ................... F04D 29/426
415/112

(Continued)

FOREIGN PATENT DOCUMENTS

CN          2706607       6/2005
CN         201273288      7/2009
(Continued)

OTHER PUBLICATIONS

Japanese Office Action dated May 19, 2016 for Japanese Application No. 2015-546935, 5 pages.
(Continued)

*Primary Examiner* — Devon Kramer
*Assistant Examiner* — Joseph Herrmann
(74) *Attorney, Agent, or Firm* — RatnerPrestia

(57) ABSTRACT

A pump for pumping liquid, the pump including a drive unit and a heat sink arranged to carry off heat that is generated in the drive unit, the drive unit including a motor compartment that in the radial direction is delimited by a motor casing and that accommodates an electric motor having a stator, a coupling compartment that at least partly is delimited by a pump top casing and that accommodates a power supply component, an upper partition that is arranged between the motor compartment and the coupling compartment. The motor casing includes an outer jacket that is connected to and that in the axial direction extends between the upper partition and the heat sink, an inner stator housing
(Continued)

that extends between the stator and the heat sink, and a gas filled gap that in the radial direction separates the outer jacket and the inner stator housing.

12 Claims, 3 Drawing Sheets

(51) Int. Cl.

| | | |
|---|---|---|
| F04D 29/42 | (2006.01) | |
| F04D 29/08 | (2006.01) | |
| F04D 29/046 | (2006.01) | |
| F04B 17/03 | (2006.01) | |
| F04B 53/08 | (2006.01) | |
| H02K 5/20 | (2006.01) | |
| H02K 5/10 | (2006.01) | |
| H02K 5/22 | (2006.01) | |
| H02K 9/22 | (2006.01) | |
| F04D 13/08 | (2006.01) | |
| H02K 11/33 | (2016.01) | |

(52) U.S. Cl.
CPC ........... *F04D 13/06* (2013.01); *F04D 13/083* (2013.01); *F04D 29/046* (2013.01); *F04D 29/086* (2013.01); *F04D 29/426* (2013.01); *H02K 5/10* (2013.01); *H02K 5/20* (2013.01); *H02K 5/225* (2013.01); *H02K 9/22* (2013.01); *H02K 11/33* (2016.01)

(58) Field of Classification Search
CPC .. F04D 29/086; F04D 29/426; F04D 29/5086; H02K 5/10; H02K 5/20; H02K 5/225; H02K 9/22; H02K 11/33
USPC ......................................................... 417/373
See application file for complete search history.

(56) References Cited

U.S. PATENT DOCUMENTS

| | | | | |
|---|---|---|---|---|
| 4,484,457 A | | 11/1984 | Mugele | |
| 5,616,973 A | * | 4/1997 | Khazanov | H02K 5/20 310/54 |
| 5,667,362 A | * | 9/1997 | Murai | F04D 15/0066 417/41 |
| 5,997,261 A | * | 12/1999 | Kershaw | F04D 29/588 310/54 |
| 6,293,769 B1 | * | 9/2001 | Radermacher | F04D 13/06 417/357 |
| 6,655,930 B2 | * | 12/2003 | Sato | F04D 7/02 417/373 |
| 2003/0012918 A1 | * | 1/2003 | Torbal | F16L 59/06 428/69 |
| 2004/0062664 A1 | * | 4/2004 | Weigold | F04D 29/5813 417/357 |
| 2010/0247352 A1 | * | 9/2010 | Hansen | F04D 13/06 417/410.1 |
| 2011/0200469 A1 | * | 8/2011 | Kawabata | F04D 13/0606 417/423.3 |

FOREIGN PATENT DOCUMENTS

| | | |
|---|---|---|
| CN | 102463056 | 5/2012 |
| DE | 4212982 | 10/1993 |
| EP | 0990800 | 4/2000 |
| JP | 10201168 | 7/1998 |
| JP | 1175345 | 3/1999 |
| JP | 2000205174 | 7/2000 |
| JP | 2009264235 | 11/2009 |
| JP | 2011163263 | 8/2011 |
| JP | 2012110177 | 6/2012 |
| WO | 2011099196 | 8/2011 |

OTHER PUBLICATIONS

English translation of CN Office Action for Application No. 201380064995.1, dated Jul. 18, 2016, 8 pages.
International Preliminary Report on Patentability for International Application No. PCT/EP2013/075217 dated Feb. 4, 2015.
International Search Report for International Application No. PCT/EP2013/075217 dated Feb. 6, 2014.
Written Opinion of the International Searching Authority for International Application No. PCT/EP2013/075217 dated Feb. 6, 2014.
Colombian Office Action for Colombian Application No. 15137576, dated Nov. 11, 2016, including brief English summary, 8 pages.

* cited by examiner

COOLING ARRANGEMENT OF A PUMP INTENDED FOR PUMPING A LIQUID

CROSS-REFERENCE TO RELATED APPLICATIONS

This patent application is a U.S. National Phase Patent Application of PCT Application No. PCT/SE2013/075217, filed Dec. 2, 2013, which claims priority to Swedish Patent Application No. 1251424-6, filed Dec. 14, 2012, each of which is incorporated by reference herein in its entirety.

TECHNICAL FIELD OF THE INVENTION

The present invention relates in general to a pump for pumping a liquid, such as a waste water pump. Specifically, the present invention relates to a pump comprising a drive unit and a heat sink connected to said drive unit, which heat sink is arranged to carry off heat that is generated in said drive unit during operation of the pump. The drive unit comprises a motor compartment, a coupling compartment and an upper partition, the motor compartment in the radial direction being delimited by a motor casing and accommodates an electric motor having a stator, the coupling compartment at least partly being delimited by a pump top casing and accommodates a power supply component, and the upper partition being arranged between said motor compartment and said coupling compartment.

BACKGROUND OF THE INVENTION AND PRIOR ART

A waste water pump has as a rule only one heat source from which heat, generated during operation of the pump, must be carried off in order not to damage the heat source or having the heat source to be turned off by means of conventional protection equipment due to a too high temperature in the pump. This heat source is constituted by the electrical motor of the pump, which electrical motor is arranged in the motor compartment of the drive unit. The stator of the electrical motor is pressed into the motor casing/stator housing of the pump and the heat is carried off to the surrounding media. The surrounding media is constituted by a liquid if the pump is immersed/submerged and is alternatively constituted by a gas if the pump is dry installed. In the latter case the heat transport to the surrounding media is insufficient and is reinforced either by means of external air cooling using fans or by means of heat transport via the motor casing/stator housing to the heat sink of the pump, which in its turn is cool down by the liquid that is draw into and pump out from the pump.

Usually the electrical equipment is arranged in a coupling compartment that is located on the opposite side of the motor compartment in relation to the heat sink, i.e. in the top of the pump, and this electrical equipment has in previously occurring pumps not required dedicated cooling. In the most elementary design the electrical equipment is constituted by a connection block intended to connect the incoming electric cable and the internal cabling.

However, the future pumps will more often comprise an internal power supply component arranged in said coupling compartment, and in contrast to other electric equipment such power supply components require dedicated cooling in order not to be damaged and in order not to have the safety equipment turning off the pump due to a too high temperature at the power supply component. Due to the fact that the coupling compartment is located un top of the motor compartment in relation to the lower heat sink, the heat in the coupling compartment has to exceed the heat in the motor compartment in order to have the heat carried off from the coupling compartment past the intermediate motor compartment and to the lower heat sink. However, the electric motor generate much more heat than the power supply component, and the coupling compartment and the power supply component are heated by the motor instead of being cooled off in the desired way, which has a negative effect on the power supply component and lead to undesired safety stop of the pump.

BRIEF DESCRIPTION OF THE OBJECTS OF THE INVENTION

The present invention aims at obviating the above described drawbacks and failing of previously known pumps and at providing an improved pump. A basic object of the invention is to provide an improved pump of initially described type, which secure that the coupling compartment and the power supply component are provided necessary cooling despite the fact that the temperature in the coupling compartment does not exceed the temperature in the motor compartment.

BRIEF DESCRIPTION OF THE INVENTION

According to the invention at least the basic object is attained by means of the initially defined pump, having the features defined in the independent claim. Preferred embodiments of the present invention are further defined in the dependent claims.

According to the present invention a pump according to the initially defined type is provided, which pump is characterized in that motor casing of the pump comprises an outer jacket that is connected to and that in the axial direction extends between the upper partition and the heat sink, an inner stator housing that extends between the stator of the electric motor and the heat sink, and a gas filled gap that in the radial direction separate the outer jacket and the inner stator housing.

Thus, the present invention is based on the understanding that by providing separate, mutually isolated, heat conducting paths leading from the motor compartment and the coupling compartment, respectively, to the heat sink, the problems arising due to the above mentioned mutual temperature relation between the motor compartment and the coupling compartment are set aside.

According to a preferred embodiment of the present invention the heat sink comprises a lower partition that is arranged between the drive unit and a pump chamber arranged in the hydraulic unit. Thereto, it is preferred that said hydraulic unit comprises a pump housing that delimit said pump chamber, said lower partition being fixedly connected to the pump housing.

According to yet another preferred embodiment the inner stator housing is abutting the lower partition, leading to direct contact between the stator housing and the lower partition which promote the heat conducting capacity.

In a preferred embodiment the upper partition and the outer jacket are fixedly connected to each other.

Other advantages with and features of the invention are evident from the other dependent claims as well as from the following detailed description of preferred embodiments.

Further Elucidation of Prior Art

Documents WO 2011/099198, U.S. Pat. No. 5,616,973 and DE 42 12 982 all disclose a pump for pumping liquid and having a motor casing surrounding the drive unit of the pump. Each of said motor casings comprise a gap filled with a liquid coolant in order to carry off the heat generated in the drive unit.

BRIEF DESCRIPTION OF THE DRAWINGS

A more complete understanding of above mentioned and other features and advantages of the present invention will be apparent from the following detailed description of preferred embodiments having references to the appended drawings, in which.

DETAILED DESCRIPTION OF PREFERRED EMBODIMENTS

Figure 1:
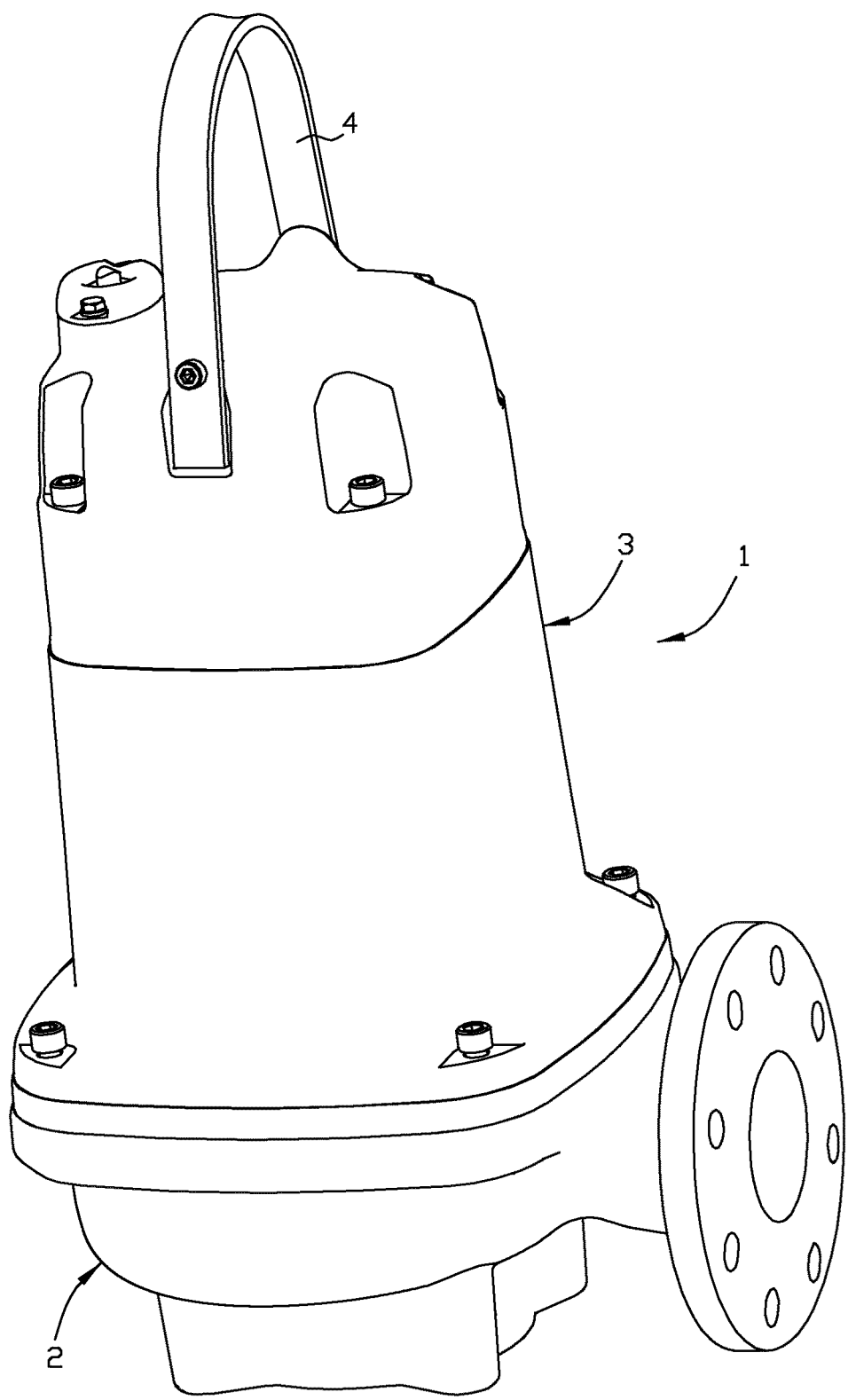
FIG. 1 is a schematic perspective view from above of a pump.

Reference is initially made to FIG. 1. The present invention relates to a pump, generally designated 1, preferably suitable for pumping waste water or other liquid comprising solid matter. Specifically the present invention relates to centrifugal pump. The pump 1 comprises a hydraulic unit, generally designated 2, and a drive unit, generally designated 3. In the shown embodiment the drive unit is arranged above said hydraulic unit 2, such pumps 1 may however be arranged lying or in any other arbitrary angle in relation to the horizontal plane. The inventive pump 1 will hereinafter be described as being upright. In the upper end of the pump 1, it comprises a lifting eye 4, or the like, for lowering of the pump 1 into and hoisting of the pump 1 out from the tank/basin (not shown).

Figure 2:
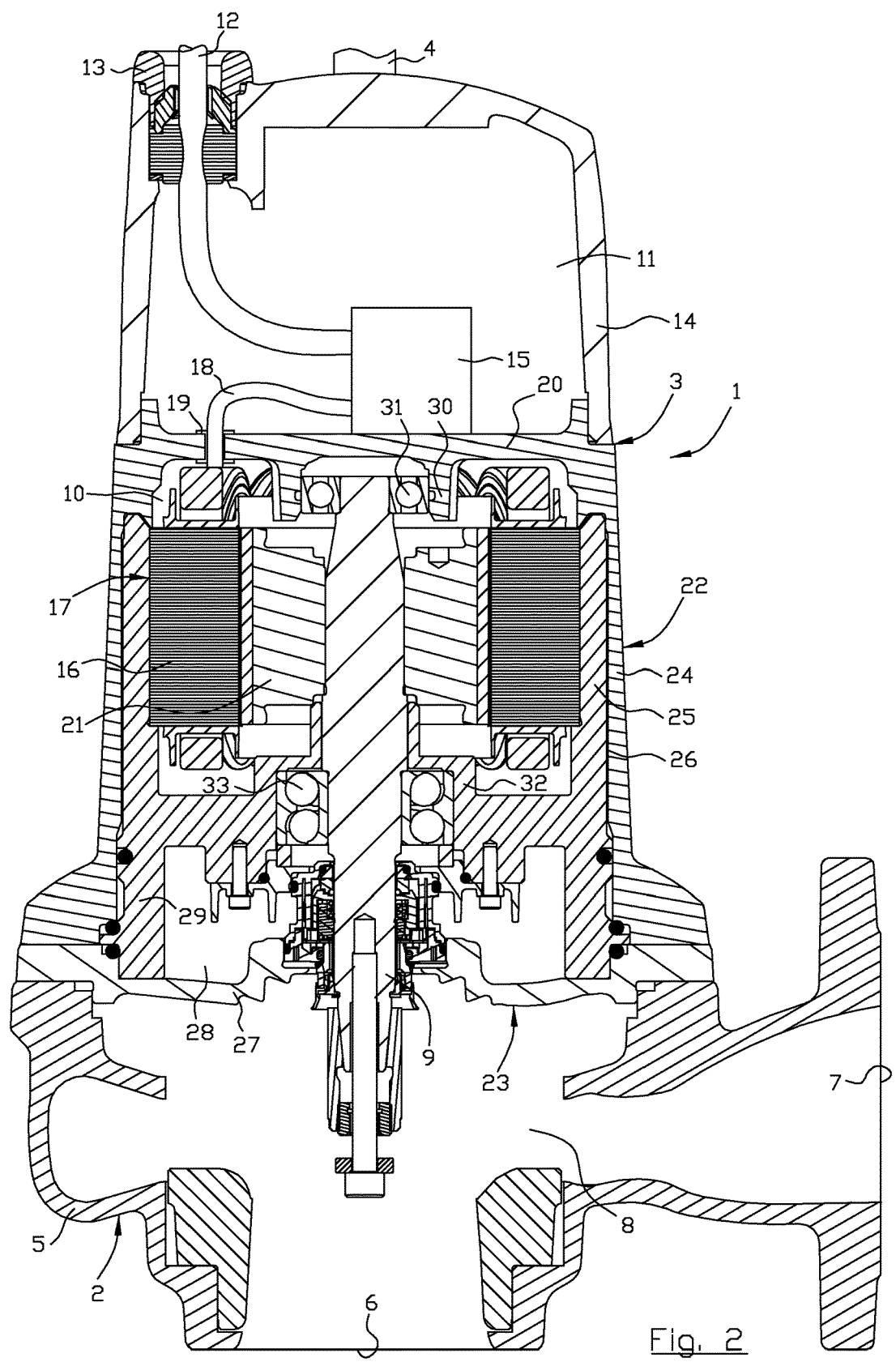
FIG. 2 is a schematic cross section side view of a preferred embodiment of an inventive pump.

Reference is now made to FIG. 2, which discloses a preferred embodiment of the inventive pump 1.

The hydraulic unit 2 of the pump 1 comprises a pump housing 5 having an inlet 6 and an outlet 7, the pump housing 5 at least partly defining/delimiting a pump chamber 8 which connect said inlet 6 and said outlet 7 and through which the pumped liquid is made to pass during operation of the pump 1. The pump chamber 8 accommodates in a conventional way an impeller, however removed from FIG. 2, for pumping the liquid out through the outlet 7. The impeller is in a suitable way connected to a lower end of a drive shaft 9 and is arranged to rotate jointly therewith. The impeller may be of a so called closed or open type.

The drive unit 3 of the pump 1 comprises a motor compartment 10 and a coupling compartment 11. A incoming electric cable 12 extends into the coupling compartment 11 via a cable lead through 13 that is arranged in a pump top casing 14, which at least partly delimit said coupling compartment 11. Besides being a power supply cable the incoming electric cable 12 may also transmit control signals or the like to the pump 1. The cable lead through 13 provide liquid tight lead through of the electric cable 12 through the pump top casing 14, in order to prevent that the liquid in which the pump 1 is lowered, or any other liquid, will get into the coupling compartment and damage the pump 1. The coupling compartment 11 house electric equipment, especially a power supply component 15 that is directly or indirectly connected to the electric cable 12. The power supply component 15 is preferably constituted by a speed control unit, for instance also known under the term VFD (Variable Frequency Drive). The power supply component 15 is moreover operatively connected to a stator 16 of an electric motor 17 that is housed in the motor compartment 10. In the shown embodiment an outgoing motor cable 18 extends from the power supply component 15 into the motor compartment 10 via a cable lead through 19 that is arranged in an upper partition 20, which is arranged between the coupling compartment 11 and the motor compartment 10. The electric motor 17 comprises also as customary a rotor 21 that is connected to the drive shaft 9, the drive shaft 9 and the rotor 21 being arranged to rotate jointly in the stator 16 during operation of the pump 1. The power supply component 15 entail that the electric motor 17 can be driven by variable frequency in order to adjust the rotational speed of the drive shaft 9 and the impeller, in order to optimize the operation of the pump 1. The cable lead through 19 located in the upper partition 20 prevent all possible oil or liquid that has entered the motor compartment 10 from entering the coupling compartment 11 and damaging the electrical equipment, as well as preventing liquid that has entered the coupling compartment 20 from entering the motor compartment 10 and damaging the motor 17. The coupling compartment 11 and the motor compartment 10 are gas filled, preferably the gas is constituted by air.

Thus, the coupling compartment 11 delimited in the shown embodiment by the pump top casing 14 and the upper partition 20. The motor compartment 10 is delimited in the radial direction by a motor casing 22, and in the direction towards the coupling compartment 11 by the upper partition 20. The drive unit 3 is connected to a heat sink, generally designated 23, which is adapted to carry off heat that is generated in the drive unit 3 during operation of the pump 1, more precisely heat that is generated by at least the motor 17 and the power supply component 15. The heat sink 23 is arranged at the interface between the drive unit 3 and the hydraulic unit 2, the liquid that is pumped through the pump chamber 8 absorbing the heat from the heat sink 23 and transporting the heat away from the pump 1.

According to the present invention the motor casing 22 of the drive unit 3 comprises an outer jacket 24 and an inner stator housing 25, which in the radial direction are separated by means of a gas filled gap 26. The outer jacket 24 is connected to and extends in the axial direction between the upper partition 20 and the heat sink 23, the inner stator housing 25 extending between the stator 16 of the motor 17 and the heat sink 23. In this way separate heat conducting paths are obtained from the coupling compartment 11 and the motor compartment 10, respectively, to the heat sink 23. The outer jacket 24 and the inner stator housing 25 are preferably concentrically arranged, and the intermediate gas filled gap 26 is preferably toroid shaped. Preferably the upper partition 20 and the outer jacket 24 of the motor casing 22 are fixedly connected to each other, which promote good heat conduction from the upper partition 20 to the outer jacket 24.

Figure 3:
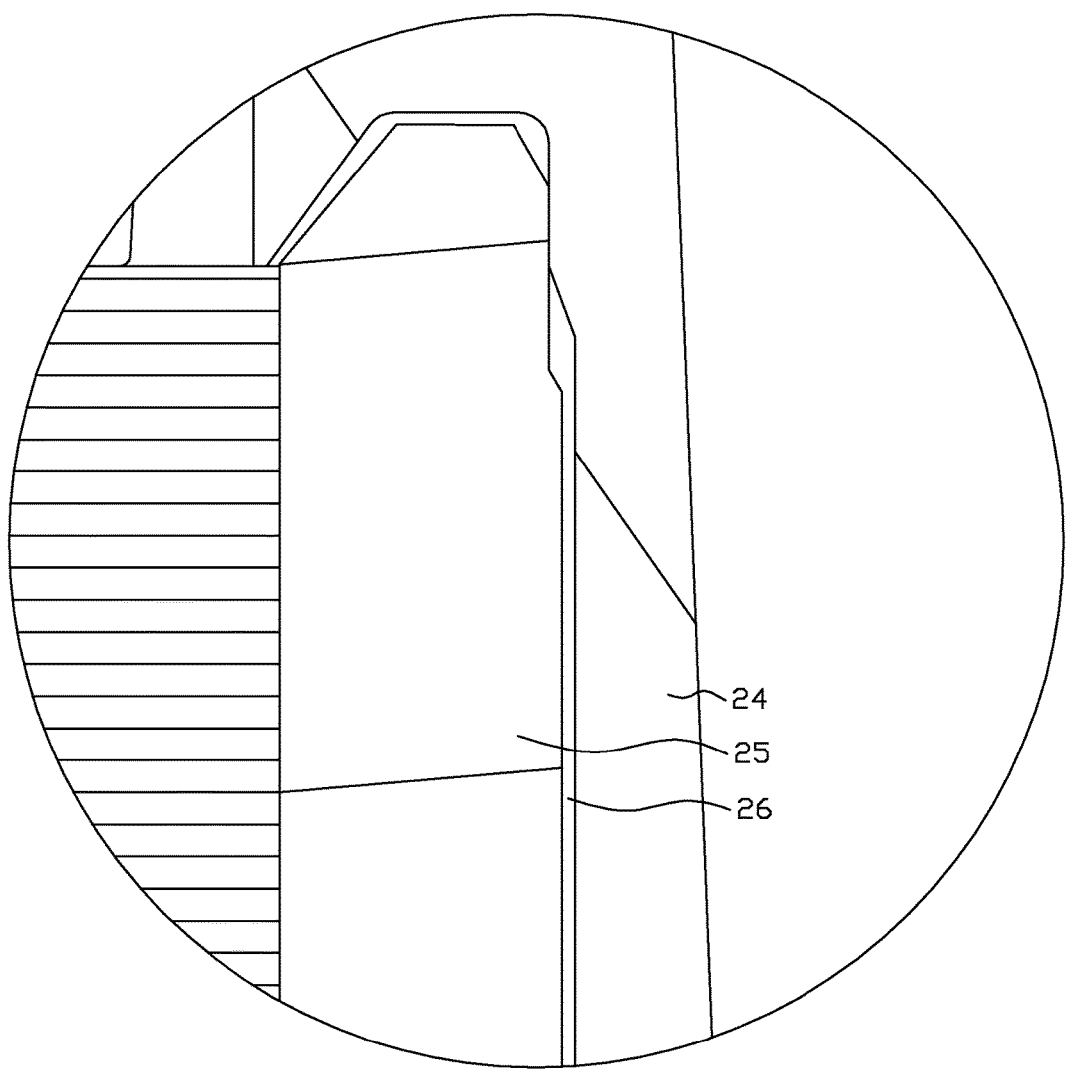
FIG. 3 is an enlarged view of a part of the pump according to FIG. 2.

In the shown preferred embodiment, see also FIG. 3, the inner stator housing 25 abut the outer jacket 24 in the area of the upper end of the inner stator housing 25 and in the area of the lower end of the stator housing 25, in order to obtain correct and unchanging location/alignment of the stator 16 of the motor 17 in relation to the drive shaft 9. However, it shall be mentioned, in the cases the above mentioned guide is present between the outer jacket 24 and the inner stator housing 25, the area of the abutment surface between the inner stator housing 25 and the outer jacket 24 is small in relation to the interface area between the inner stator housing 25 and the outer jacket 24, which interface area is constituted by the gap 26, at least less than 8 percent.

Preferably the heat sink 23 comprises a lower partition 27 that is arranged between the drive unit 3 and the pump chamber 8 of the hydraulic unit 2. The outer jacket 24 of the motor casing 22 abuts the lower partition 27. Preferably the pump housing 5 of the hydraulic unit 3 and the lower partition 27 are fixedly connected to each other. Preferably the heat sink 23 comprises a liquid seal chamber 28 comprising a liquid, preferably an oil. The liquid seal chamber 28 is arranged at the opposite side of the lower partition 27 in relation to said pump chamber 8.

In the area of its lower end, the inner stator housing 25 is adjacent to the liquid seal chamber 28 and the heat in the inner stator housing 25 is absorbed by the liquid in the liquid seal chamber 28 and is carried off via the liquid to the lower partition 27. Preferably the inner stator housing 25 comprises axial extensions 29 in the area of its lower end, which axial extensions 29 abut the lower partition 27. Direct contact between the inner stator housing 25 and the lower partition 27 promote further improved heat conduction from the inner stator housing 25 to the lower partition 27.

The drive shaft 9 extends in the axial direction from the motor compartment 10, through the lower partition 27 and end in said pump chamber 8. Conventional seals are arranged in connection with the passage of the drive shaft 9 in the lower partition 27, in order to prevent the pumped liquid from passing the lower partition 27. Furthermore it is preferred that the upper partition 20 comprises an upper bearing holder 30, in which an upper bearing 31 is arranged, the upper end of the drive shaft 9 being received in said upper bearing 31. It is also preferred that the inner stator housing 25 comprises a lower bearing holder 32, in which a lower bearing 33 is arranged, the drive shaft 9 extending through said lower bearing 33.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/ concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A pump for pumping liquid, comprising a drive unit and a heat sink connected to said drive unit, where the heat sink is arranged to carry off heat that is generated in said drive unit during operation of the pump, the drive unit comprising:

a motor compartment that in the radial direction is delimited by a motor casing and that accommodates an electric motor having a stator, a coupling compartment that is at least partly delimited by a pump top casing and that accommodates a power supply component, an upper partition that is arranged between said motor compartment and said coupling compartment, wherein the motor casing comprises:
  (i) an outer jacket that is connected to and extends between the upper partition and the heat sink in the axial direction,
  (ii) an inner stator housing that extends between the stator and the heat sink, and
  (iii) a gas filled gap that separates the outer jacket and the inner stator housing in the radial direction; and
wherein the heat sink comprises a liquid seal chamber that is separate and isolated from the gas filled gap.

2. The pump according to claim 1, wherein the heat sink comprises a lower partition, that is arranged between the drive unit and a pump chamber, the pump chamber being arranged in a hydraulic unit.

3. The pump according to claim 2, wherein the hydraulic unit comprises a pump housing that delimits said pump chamber, said lower partition being fixedly connected to the pump housing.

4. The pump according to claim 2, wherein the inner stator housing is abutting the lower partition.

5. The pump according to claim 1, wherein the inner stator housing is adjacent the liquid seal chamber.

6. The pump according to claim 2, wherein the liquid seal chamber is arranged at the opposite side of the lower partition in relation to said pump chamber.

7. The pump according to claim 2, wherein the pump comprises a drive shaft that is connected to the electric motor and that extends in the axial direction from the motor compartment, through the lower partition and ends in said pump chamber.

8. The pump according to claim 1, wherein the upper partition comprises an upper bearing holder.

9. The pump according to claim 1, wherein the inner stator housing comprises a lower bearing holder.

10. The pump according to claim 1, wherein the upper partition and the outer jacket are fixedly connected to each other.

11. The pump according to claim 1, wherein the power supply component is constituted by a speed control unit that is operatively connected to the stator of the electric motor.

12. The pump according to claim 1, wherein the liquid seal chamber of the heat sink is separated from the gas filled gap by the inner stator housing, and wherein two separate heat conducting paths are provided to the heat sink, wherein a first heat conducting path of the two separate heat conducting paths extends from the motor compartment to the heat sink via the inner stator housing, and a second heat conducting path of the two separate heat conducting paths extends from the coupling compartment to the heat sink via the outer jacket, wherein said gas filled gap is interposed between the first heat conducting path and the second heat conducting path.

* * * * *